(12) United States Patent
Hagan et al.

(10) Patent No.: US 12,497,251 B2
(45) Date of Patent: Dec. 16, 2025

(54) METHOD OF MOVING PROPPANT FROM A SAND CONTAINER

(71) Applicant: Halliburton Energy Services, Inc., Houston, TX (US)

(72) Inventors: Ed Bryan Hagan, Duncan, OK (US); Wesley John Warren, Duncan, OK (US); Cameron Michael Kramer, Duncan, OK (US); Timothy Holiman Hunter, Duncan, OK (US); John Leslie Imel, Duncan, OK (US); Andrew Silas Clyburn, Duncan, OK (US); Chad A. Fisher, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 322 days.

(21) Appl. No.: 18/128,098

(22) Filed: Mar. 29, 2023

(65) Prior Publication Data
US 2024/0327141 A1    Oct. 3, 2024

(51) Int. Cl.
B65G 65/44    (2006.01)
B65G 3/04    (2006.01)

(52) U.S. Cl.
CPC ............ *B65G 65/44* (2013.01); *B65G 3/04* (2013.01); *B65G 2814/0302* (2013.01); *B65G 2814/0323* (2013.01)

(58) Field of Classification Search
None
See application file for complete search history.

(56) References Cited

U.S. PATENT DOCUMENTS

| | | | | |
|---|---|---|---|---|
| 2,381,802 A | * | 8/1945 | Booth | B01J 8/003 222/203 |
| 3,363,806 A | * | 1/1968 | Blakeslee | B65D 88/66 222/413 |
| 3,831,686 A | * | 8/1974 | Brookman | B03C 3/766 173/132 |
| 4,496,076 A | * | 1/1985 | Tompkins | B65D 88/703 406/137 |
| 5,215,228 A | * | 6/1993 | Andrews | B65D 88/66 406/134 |
| 7,252,309 B2 | | 8/2007 | Eng Soon et al. | |
| 7,484,574 B2 | * | 2/2009 | Burnett | B65G 53/60 175/207 |
| 9,758,082 B2 | * | 9/2017 | Eiden, III | B65G 65/42 |
| 10,618,744 B2 | * | 4/2020 | Eiden, III | B65D 88/32 |
| 10,982,505 B2 | | 4/2021 | Oehler et al. | |
| 11,643,287 B2 | * | 5/2023 | Dawson | B65G 65/40 414/222.01 |

(Continued)

*Primary Examiner* — Paul R Durand
*Assistant Examiner* — Michael J. Melaragno
(74) *Attorney, Agent, or Firm* — Conley Rose, P.C.; Rodney B. Carroll

(57) ABSTRACT

A bulk material dispensing system comprising a portable support structure with portable containers with wet bulk material. Locating each portable container onto the portable support structure couples a transfer member on each portable container to a vibration device on the support structure. Vibration energy is transferred from vibration device to the portable container via the transfer member. The material dispensing system is configured to route the wet bulk material from the portable container to a blender hopper via a material routing path in response to activating the vibration device.

24 Claims, 8 Drawing Sheets

(56) References Cited

U.S. PATENT DOCUMENTS

| | | |
|---|---|---|
| 2004/0008571 A1 | 1/2004 | Coody et al. |
| 2007/0215386 A1* | 9/2007 | Burnett .................. B65G 53/12 |
| | | 175/66 |
| 2017/0341264 A1* | 11/2017 | Yang ..................... B28C 7/0061 |
| 2024/0327141 A1* | 10/2024 | Hagan ..................... B65G 3/04 |

* cited by examiner

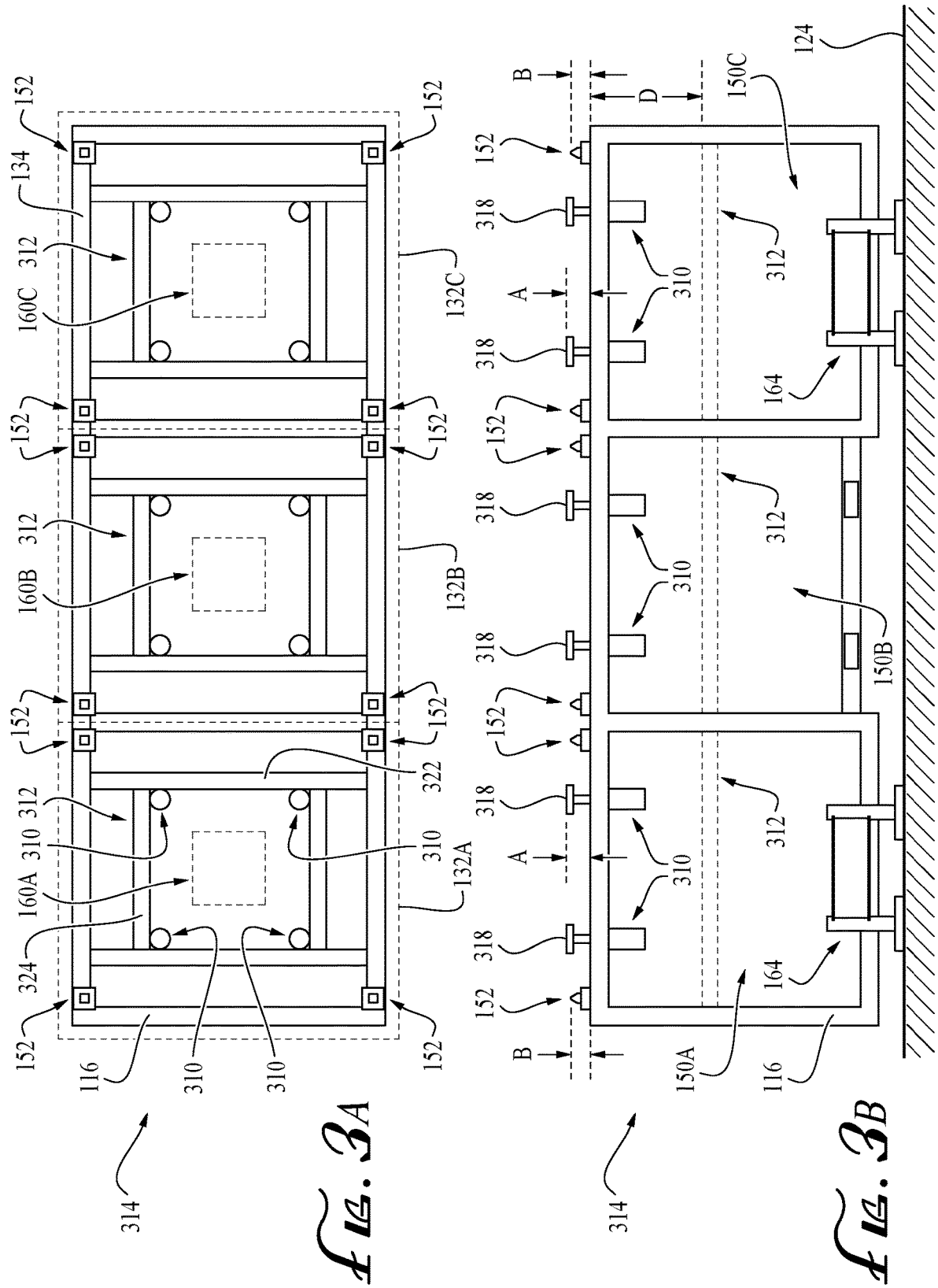

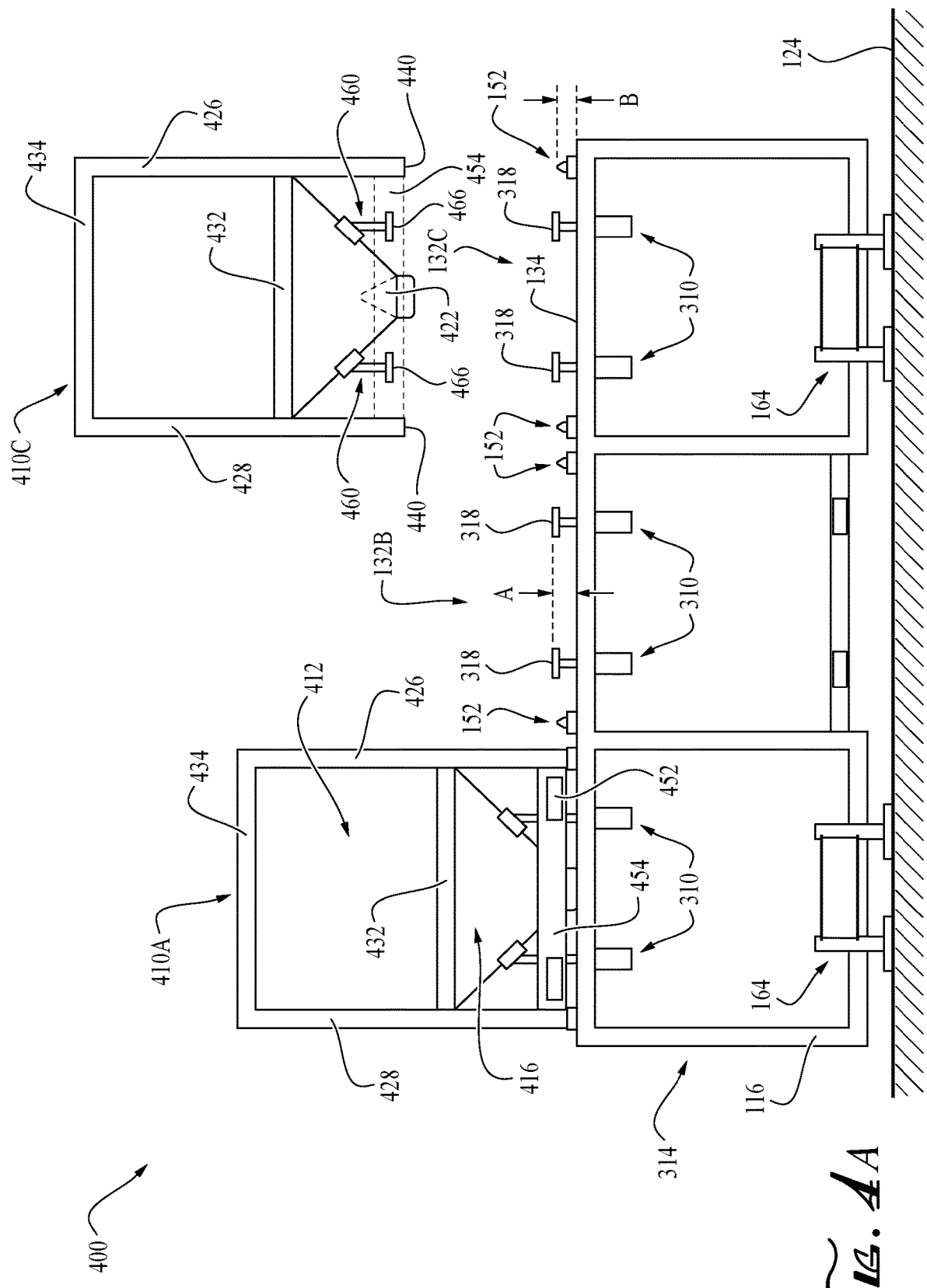

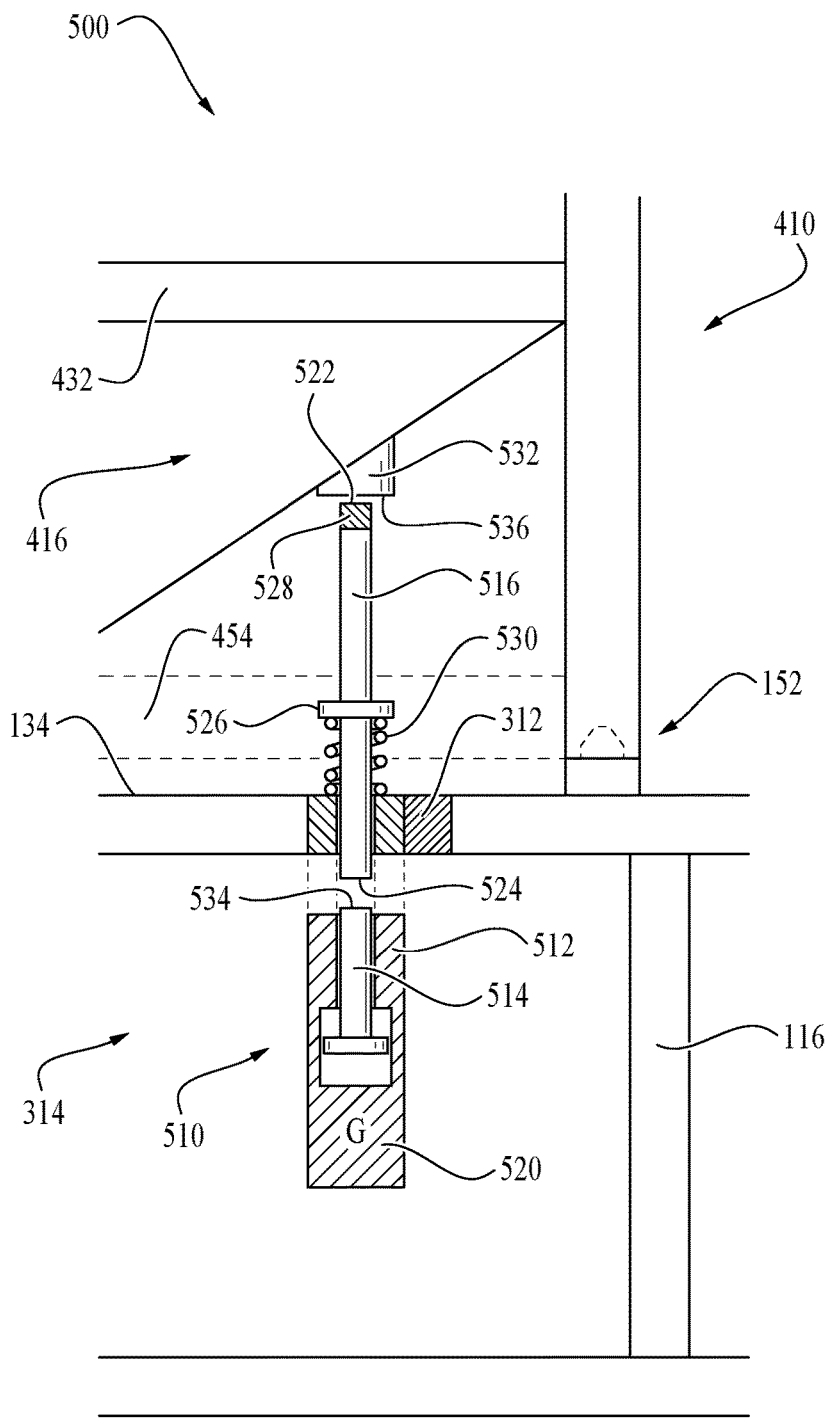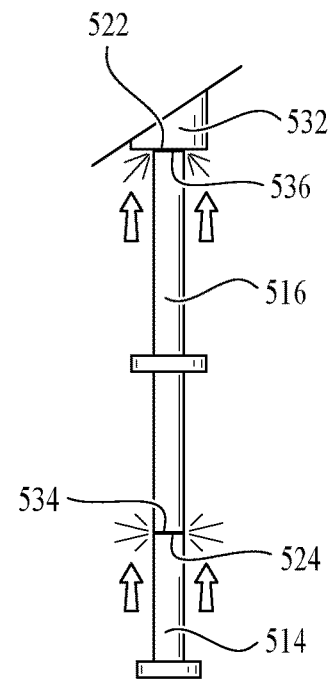
FIG. 5A
FIG. 5B

METHOD OF MOVING PROPPANT FROM A SAND CONTAINER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

During the drilling and completion of oil and gas wells, various wellbore treating fluids are used for a number of purposes. For example, propping agents mixed with high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the wellsite for a wellbore servicing operation. Systems for metering and mixing the various materials are normally portable, e.g., skid- or truck-mounted, since they are only needed for the wellbore servicing operation at a well site.

Recent developments in bulk material handling operations involve the use of portable containers for transporting dry material about a well location. The portable containers can be brought in on trucks, unloaded, stored on location, and manipulated about the well site when the material is needed. The containers are generally easier to manipulate on location than a large supply tank trailer. The portable containers dispense the bulk materials onto a mechanical conveying system (e.g., conveyor belt, auger, bucket lift, etc.). The conveying system then moves the bulk material in a metered fashion to a desired destination at the well site.

The water content within the bulk materials inside the portable containers can inhibit the discharge of material from the portable containers. The wet bulk material can clump together to form a bridge, create a funnel type shape, and adhere to the sides of container. One solution is to dry the material before loading the material into the portable containers. However, this solution can come at a considerable expense. Other systems have attempted to address the discharge of wet bulk material via the use of vibration devices and vibratory energy. However, problems arise from such systems, which may unduly vibrate an entire structure, e.g., stand, and all ancillary equipment contacting or supported by such vibrating structure (thereby subjecting such ancillary equipment to damage) and/or require complex and costly dampening or isolation systems to protect the various equipment from unwanted vibrations. A method of dispensing wet bulk materials from portable containers is desirable.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3A is a top view of a portable support structure according to another embodiment of the disclosure.

FIG. 3B is a side view of a portable support structure according to another embodiment of the disclosure.

FIG. 4A is a side view of a bulk material handling system with portable containers according to still another embodiment of the disclosure.

FIG. 5A is a side view of a bulk material handling system with portable containers according to yet another embodiment of the disclosure.

FIG. 5B is a detailed view of a system of striking a container according to yet another embodiment of the disclosure.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Certain embodiments according to the present disclosure may be directed to systems and methods for efficiently managing bulk material (e.g., bulk solid or liquid material). Bulk material handling systems are used in a wide variety of contexts including, but not limited to, drilling and completion of oil and gas wells, concrete mixing applications, agriculture, and others. The disclosed embodiments are directed to systems and methods for efficiently moving bulk material into a blender inlet of a blender unit at a job site. The systems may include a portable support structure used to receive one or more portable containers of bulk material and output bulk material from the containers directly into the blender inlet. The disclosed techniques may be used to efficiently handle any desirable bulk material having a solid or liquid constituency including, but not limited to, sand, proppant, gel particulate, diverting agent, dry-gel particulate, liquid additives and others.

Figure 1:
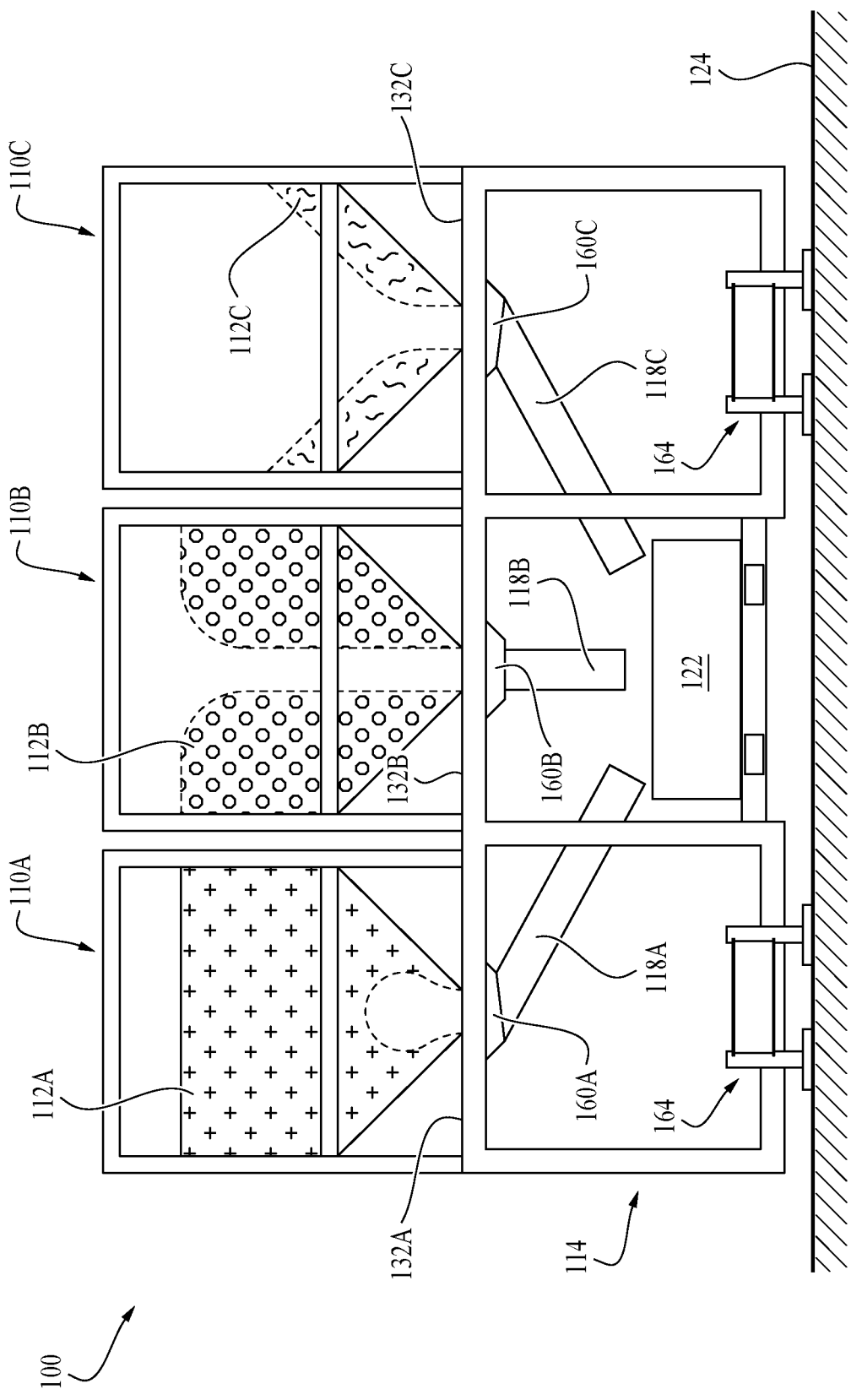
FIG. 1 is a front view of a bulk material handling system at a wellsite according to an embodiment of the disclosure.

Wellbore servicing operations at remote wellsites can utilize on-site bulk material handling systems to dispense dry material (e.g., sand, proppant, gel particulate, or dry-gel particulate) for the formation of wellbore treatment fluids. Turning now to FIG. 1, a bulk material handling system is described. The bulk material handling system 100 can include a set of portable container 110 mounted on a receiving bay 132 and elevated by a portable support structure 114. The portable support structure 114 can include a set of outrigger devices 164 to level and support the portable support structure 114 with feet or pads that contact the ground 124. The bulk material 112 with some water content, e.g., wet bulk material, is illustrated with a partial cross-sectional view of the portable containers 110A, 110B, 110C. In an example, the bulk material 112A in portable container 110A may bridge off and create a cavity above the outlet, also referred to as arching, preventing the material from flowing into a feed hopper 160A, a gravity feed outlet 118A, and into a blender hopper 122. In another scenario, the bulk material 112B in portable container 110B may create a tunnel, also referred to as rat-holing, above the outlet preventing the material from flowing into a feed hopper 160B, a gravity feed outlet 118B, and into a blender hopper 122. In still another scenario, the bulk material 112C in portable container 110C may adhere to the wall above the outlet preventing the material from flowing into a feed hopper 160C, a gravity feed outlet 118C, and into a blender hopper 122. In each of these scenarios, the supply of bulk material can be interrupted or prevented by the amalgamation of bulk material, e.g., clumping, in response to the moisture content of the bulk material, e.g., bulk material 112A, adhering to the walls of the portable container, e.g., portable container 110A.

As defined herein, wet bulk material can contain a range of water content. In some scenarios, the wet bulk material can be mined proppant with a residual water content. In other scenarios, the wet bulk material can have water added, e.g., sprayed onto the top of the dry material, to prevent formation of dust. The wet bulk material can be considered to be "wet" when the moisture content within all or a portion of the bulk material deters or inhibits the bulk material's flowability, e.g., an increased angle of repose compared to a dry sample of bulk material. For example, sand is considered "wet" when the sand contains from 0.2 percent to about 15 percent residual liquid content by weight.

The material handling systems with a support structure disclosed herein are designed to address and eliminate the shortcomings associated portable container with wet bulk material. The portable support structure can include a frame for receiving and holding one or more portable bulk material containers in an elevated position proximate the blender inlet (e.g., blender hopper or mixer inlet), as well as one or more gravity feed outlets for routing the bulk material from the containers directly into the blender inlet. In some embodiments, the portable support structure can comprise one or more impact devices for transferring impact energy and/or a percussive force to a portable container.

The disclosed portable support structure can provide an elevated location for one or more bulk material containers to be placed while the proppant (or any other liquid or solid bulk material used in the fluid mixtures at the job site) is transferred from the containers to the blender. The support structure can elevate the bulk material containers to a sufficient height above the blender inlet and route the bulk material directly from the containers to the blender inlet. The support structure can employ one or more impact devices to apply impact force to the portable containers, a portion of the portable containers, and/or a specific location on the portable container. The one or more impact devices may eliminate the need for drying of the bulk materials before loading into the portable containers. This may lower the cost of the wellbore treatment operation by using all or a greater portion of the bulk material within each portable container before replacement. This may improve the efficiency of the operation by returning empty or nearly empty containers to the bulk material supplier for refilling. In addition, the portable support structure may simplify the operation of transferring bulk material, reduce material spillage, and decrease dust generation.

Figure 2:
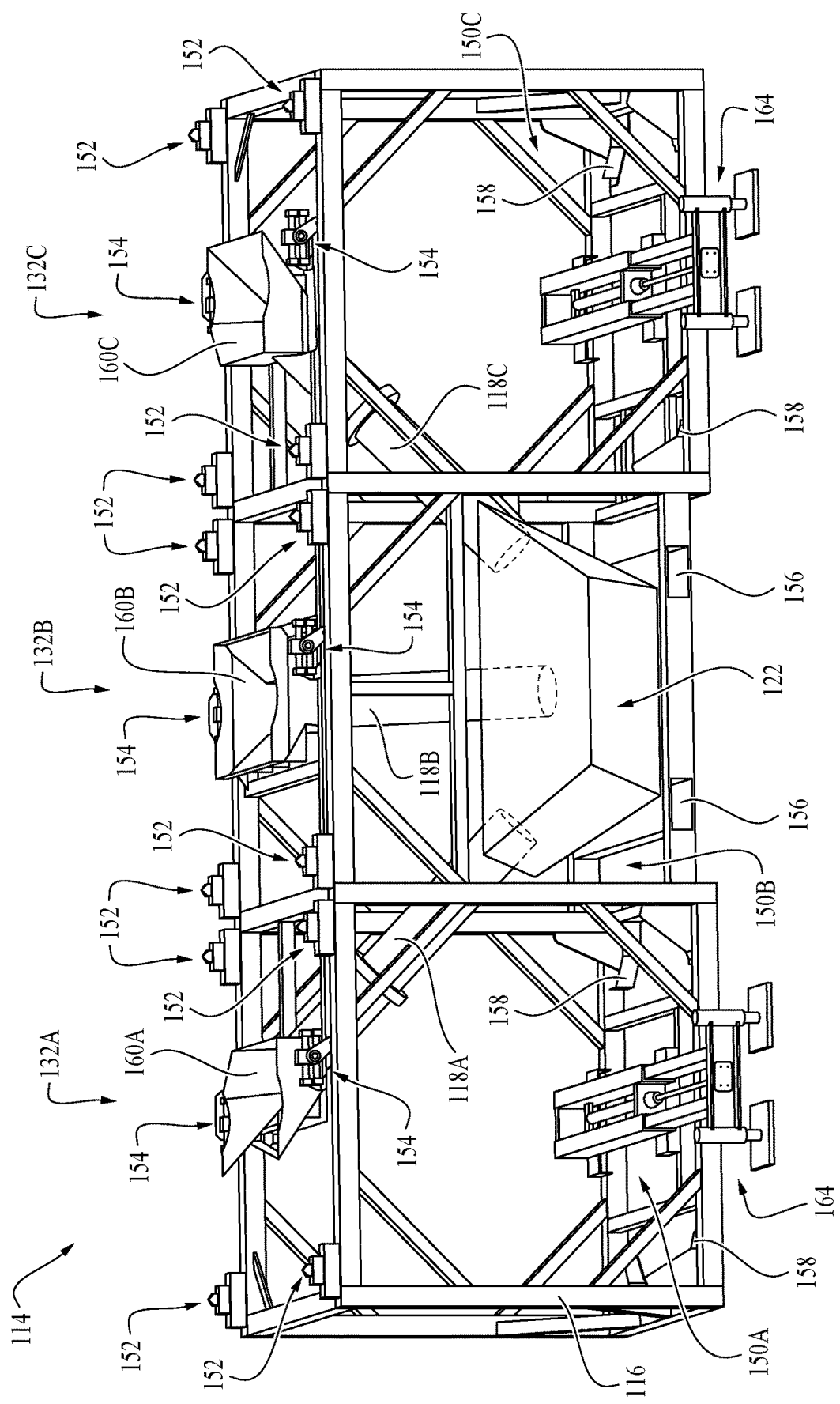
FIG. 2 is a perspective view of a portable support structure for portable containers according to an embodiment of the disclosure.

Turning now to FIG. 2, a perspective view of a portable support structure 114 for portable containers 110 is described. In an embodiment, the portable support structure, also referred to as the support structure 114, can be configured to receive more than one portable container 110. The support structure 114 includes a frame 116 sized to receive and support up to three portable containers 110. The frame 116 can include several beams connected together (e.g., via welds, rivets or bolts) to form a continuous group of cubic/rectangular supports 150 coupled end to end. For example, in the illustrated embodiment the frame 116 generally includes one continuous, elongated rectangular body broken into three distinct cubic/rectangular supports 150A, 150B, and 150C. Each cubic/rectangular support 150 can form a receiving bay 132 on top to receive, align, and support a single portable container 110. For example, the three distinct cubic/rectangular supports 150A, 150B, and 150C can have a corresponding receiving bay 132A, 132B, and 132C formed along the top surface 134. Each cubic/rectangular support 150 can support and align a material routing path within the interior of the cubic/rectangular support 150. The frame 116 can include additional beams that function as trusses to help support the weight of the filled containers disposed on the frame 116. Other shapes, layouts, and constructions of the frame 116 may be used in other embodiments. In addition, other embodiments of the support structure 114 may include a frame 116 sized to receive other numbers (e.g., 1, 2, 4, 5, 6, 7, or more) portable containers 110.

In some embodiments, the receiving bay 132 on top of the cubic/rectangular supports 150 may be equipped with a plurality of locator devices 152 disposed on top of the frame 116 for locating and holding the portable containers 110 on the frame 116. The locator devices 152 comprise a locator feature and a load sensor. The locator feature can guide or centralize the complementary engagement features of the portable containers 110, thus enabling a precise placement of the portable containers 110 into one of the receiving bays 132 on the frame 116. The load sensors within the locator devices 152 can measure the weight of the portable containers 110 and can be communicatively coupled, wired or wirelessly, to a unit controller. Although, the locator devices 152 are generally disposed at the corners on the upper face of each cubic/rectangular support 150, it is understood that other placements or locations of the locator devices 152 along the top surface 134 of the frame 116 may be utilized.

The support structure 114 can include one or more actuators 154 configured to actuate a discharge gate of the one or more portable containers 110 disposed on the frame 116. In some embodiments, the actuators 154 may be rotary actuators configured to rotate into engagement with a discharge gate of a portable container 110 to transition the gate between a closed position and an open position. In other embodiments, the actuators 154 may be linear actuators designed to interface with the gates of the portable containers 110 to selectively open and close the gates. In some embodiments, the actuators 154 may configure the gate in a meter position wherein the gate is partially open, e.g., 50% open, to partially constrain or meter the material dispensing through the gate. In some embodiments, the support structure 114 comprises a set of two actuators 154 located on opposite sides of the frame 116 for actuation of the gate on each portable container 110.

The support structure 114 may be transportable around the remote wellsite by a hoisting mechanism, e.g., a forklift, a crane, or similar lifting devices. In some embodiments, the support structure 114 can include slots 156 that a forklift can engage to lift and manipulate the portable support structure 114 about the remote wellsite. The slots 56 may be formed through a central portion (e.g., central cubic/rectangular support 50B) of the elongated support structure 114 to keep the weight of the support structure evenly distributed during its movement at the site.

Once the forklift (or other hoisting mechanism) brings the support structure 114 to a desired location at the site, the hoisting mechanism may lower the support structure 114 onto the ground surface 124 or a relatively flat loading area proximate the ground level. The frame can include outrigger devices 164 with feet or pads for increasing the size of the frame or the footprint of the frame 116. The outrigger devices can include a leveling feature to level the frame 116 on uneven ground surface 124. The outrigger devices 164 can be configured to increase the stability of the support structure 114 by keeping the support structure stable. The frame 116 can include corner supports 158 for distributing a weight of the support structure 114 (and any portable containers 110 disposed thereon) along the ground surface 124. In some embodiments, the corner supports 158 may be disposed along the lower surface of the frame 116 at various corners of the cubic/rectangular supports 150.

As previously described, the support structure 114 may include a material routing path corresponding to each receiving bay 132. The material routing path comprises a gravity feed outlets 118 for routing bulk material directly from one or more portable containers 110 disposed on the frame 116 into a blender hopper inlet 122. The gravity feed outlets 118A, 118B, and 118C may be used to deliver a flow of bulk material to the blender hopper 122 (or other blender inlet) from each of three respective portable containers 110 disposed on the frame 116 as shown in FIG. 1. In some embodiments, the material routing path can also include individual hoppers 160A, 160B, and 160C at the top of the frame 116, e.g., within the receiving bay 132, for funneling bulk material from the discharge gate of the corresponding portable containers 110 into the gravity feed outlets 118A, 118B, and 118C, respectively.

The term "blender inlet" used herein may refer to any number of inlets to tubs, hoppers, mixers, and other areas where bulk material is needed. As mentioned above, the blender hopper inlet 122 may be associated with a blender disposed at a job site (e.g., at a well site). For example, the blender inlet may be a blender hopper (e.g., blender hopper 122 of FIG. 1) used to provide bulk material to a metering system that meters the bulk material into a mixer. Other embodiments may utilize other types of blender hopper 122 for receiving the bulk material from the portable containers 110 disposed on the support structure 114.

Turning now to FIGS. 3A and 3B, a portable support structure with one or more oscillatory motion actuators is described. The portable support structure 314 in FIGS. 3A and 3B can be an embodiment of the portable support structure 114 in FIG. 1 and FIG. 2. In some embodiments, a portable support structure 314 comprises at least one oscillatory device 310 and support frame 312. The support frame 312 can be mechanically coupled, e.g., welded, to the frame 116 of the portable support structure 314. In some embodiments, the support frame 312 can comprise a single traversing member 322 with a single oscillatory device 310. In some embodiments, the support frame 312 comprises two traversing members 322 and two connecting member 324.

The oscillatory device 310 can be mechanically coupled, e.g., welded, or releasably coupled, e.g., mounting bracket, to the support frame 312. The support frame 312 can be located within each cubic/rectangular support 150A, 150B, 150C and the hoppers 160 (not shown) can be located within the support frames 312. In some embodiments, the support frame 312 can be located coincident with a top surface 134 of the frame 116. In some embodiments, the support frame 312 (and additional supporting structure) can be located a distance "D" from the top surface 134 of the frame 116. Although four oscillatory devices 310 are illustrated coupled to each support frame 312, it is understood that 1, 2, 3, 4, 5, 6, 7, 8, 9, 10, or more oscillatory devices 310 can be coupled to the support frame 312. It is understood that the portable support structure 314 is illustrated without the individual hoppers 160A, 160B, and 160C, the gravity feed outlets 118A, 118B, and 118C, the blender hopper 122, and other features from FIG. 1 and FIG. 2 for clarity and that the portable support structure 314 can include all features previously described.

In some embodiments, the oscillatory devices 310 can include a locating head 318 that extends above the top surface 134 of the frame 116. The locating head 318 can be configured to locate and couple with a mating feature on the portable containers 110. The locating head 318 can extend a distance labeled "A" above the top surface 134 of the frame 116. In comparison, the locator devices 152 can extend a distance labeled "B" above the top surface 134 of the frame 116. In some embodiments, the locating head 318 can extend above the locator devices 152, for example, distance A can be greater than distance B. In some embodiments, the locating head 318 can be about even with the locator devices 152, for example, distance A can be equal to or about equal to the distance B. In some embodiments, the locating head 318 can extend below the locator devices 152, for example, distance A can be less than distance B.

Figure 4B:
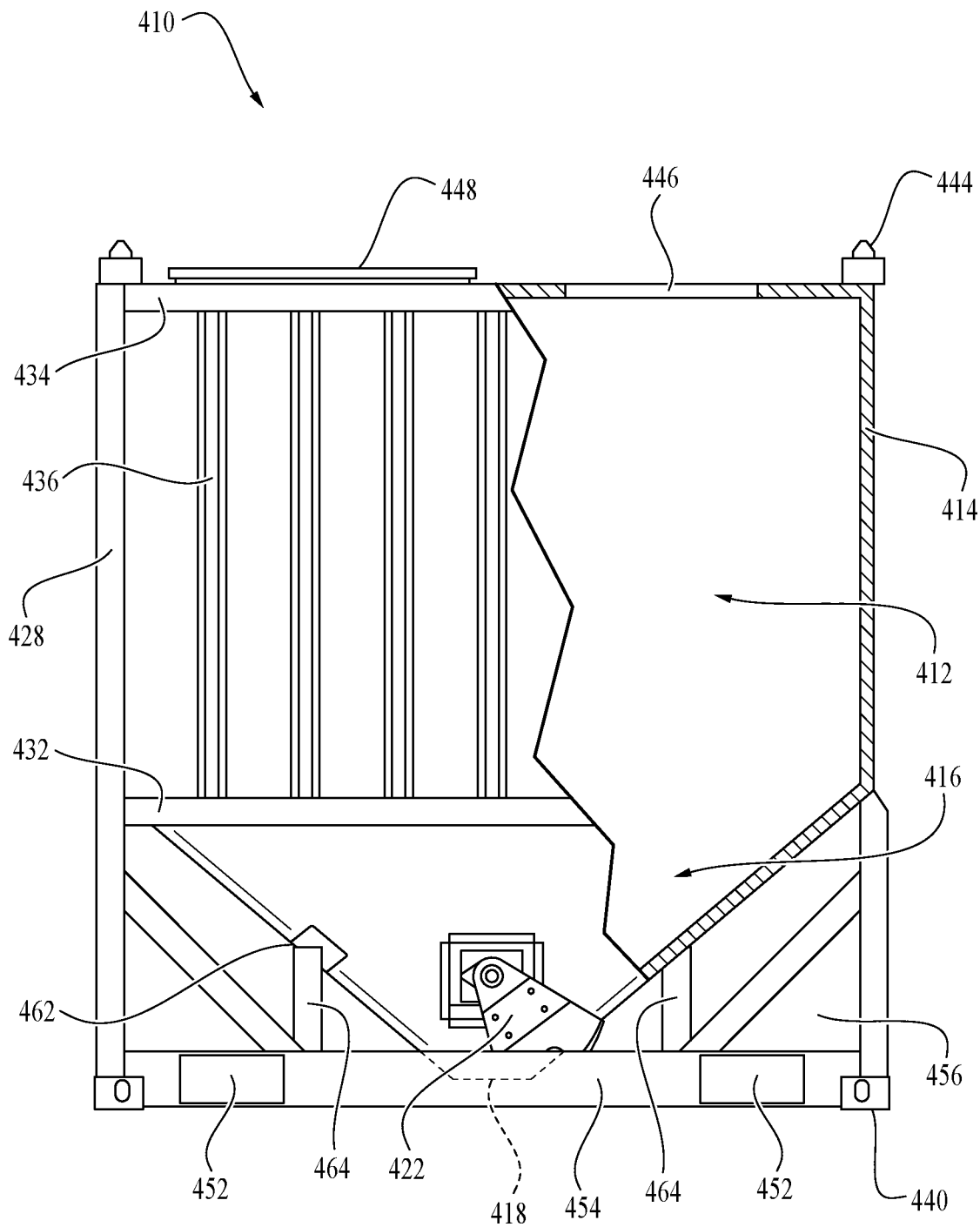
FIG. 4B is a side view of a portable container according to still another embodiment of the disclosure.

A portable container can be configured to mate with the one or more oscillatory devices configured to produce an oscillating motion coupled to the portable frame. Turning now to FIGS. 4A and 4B, a material handling system 400 comprising a portable support structure with portable containers is described. In some embodiments, the material handling system 400 comprises the portable support structure 314 and at least one portable container 410. As previously described, the portable support structure 314 comprises at least one oscillatory device 310 configured to mate with a portable container 410.

Turning now to FIG. 4B, a portable container 410 configured to receive oscillations, e.g., oscillating motion, from a oscillatory device 310 is described. In some embodiments, the portable container 410 includes an interior 412 that is defined by an opposed system of four vertical rectilinear sidewalls, e.g., sidewall 414, and an angled hopper 416 leading to an outlet 418. The angled hopper 416 can be formed by four sidewalls at an angle of 35 degrees from the horizontal in an upside down pyramidal shape. The sidewalls 414 can be rigid (e.g., planar metal) or flexible (e.g., cloth type material). At least one inlet 446 can be located at the top of the portable container 410 for filling the interior 412 with bulk material. An inlet hatch 448 can be configured to selectively open and close the inlet 446. A discharge gate 422 can be rotationally coupled to a pivot point on the angled hopper 416 and have an open configuration and a closed configuration. The sidewalls 414 are supported by a frame that includes a plurality of vertical members 426, 428, horizontal members 432, 434, and plurality of corrugations 436. The lower corners of the frame can include engagement features 440 configured to interface with the locator feature of the locator devices 152 on the portable support structure 314. The upper corners of the frame can include locator features 444 configured to interface with the engagement features 440. A bottom support 454, including a pair of lift tubes 452 and the engagement features 440, can be coupled to the bottom of the frame by modal supports 456. The discharge gate 422 can be a ladder gate, a clamshell gate, or an iris gate that may be mechanically opened and closed for the selective discharge of proppant. Although the angled hopper is described as comprising four sidewalls with a pyramidal shape, it is understood that the angled hopper can comprise any number of angled sidewalls including two angled sides, three angled sides, four angled sides, five angled sides, six angled sides, seven angled sides, eight angled sides, two curved sides, three curved sides, four curved sides, a frustoconical shape, or combinations thereof.

The portable container 410 can include a transfer member 460 coupled to the angled hopper 416. The transfer member 460 comprises a cradle 462, a column 464, and a driven pad 466. The column 464 can be a generally tubular shape mechanically coupled, e.g., welded, to the cradle 462 and the driven pad 466. The tubular shape of the column 464 can be any geometric cross-sectional shape including circular, square, triangular, rectangular, or any suitable shape. The cradle 462 can be flat plate shape configured to be coupled to the outside surface of the angled hopper 416. The driven pad 466 can be a disk shape or square shape with an upper surface 468 and a lower surface 470. The lower surface 470 can include a self-aligning feature, for example, a cone shape. Although the transfer member 460 is illustrated as coupled at a corner or the angled hopper 416 via cradle 462, it is understood that the cradle 462 can be coupled to any location along the angled hopper 416, for example, at a geometric center of a side wall of the hopper. It is understood that a second transfer member 460B can be aligned with, or in a similar position, as a first transfer member 460A, for example on an opposite corner in comparison to the first transfer member 460A. It is understood that a second transfer member 460B can be in a dissimilar location than the first transfer member 460A, for example, located in within the geometric center of a side wall of the angled hopper 416.

Figure 4C:
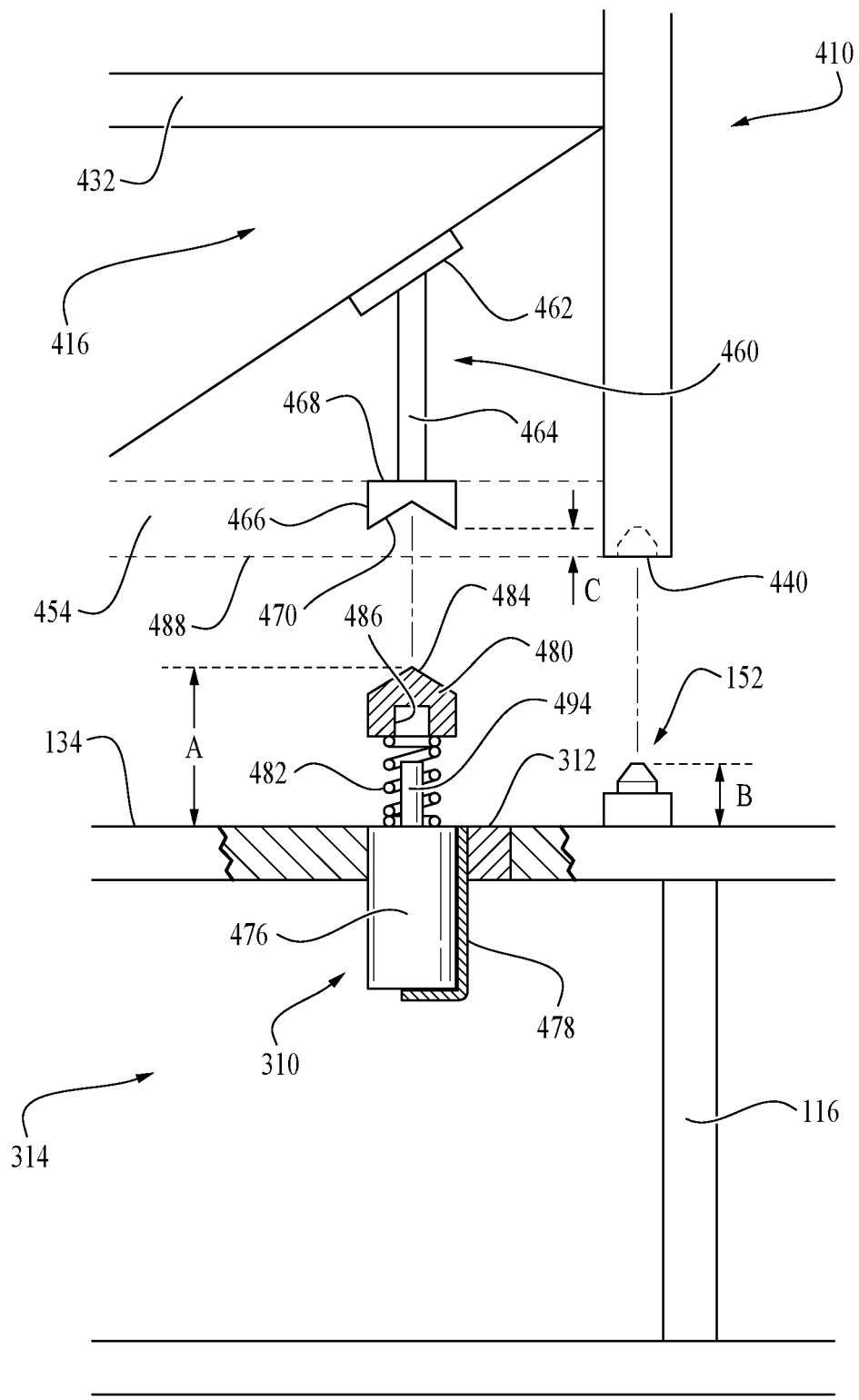
FIG. 4C is a side view of a method of installing a portable container onto a support structure according to still another embodiment of the disclosure.

Turning now to FIG. 4C, the oscillatory device 310 can comprise a motion generator 476 coupled to the support frame 312 of the portable support structure 314. The motion generator 476 can be directly coupled to the support frame 312 or coupled to a bracket 478 coupled to the support frame 312. In some embodiments, the motion generator 476 can be driven by an electrical motor, a hydraulic actuator, a pneumatic actuator, or combinations thereof. A driving pad 480 can be coupled to the motion generator 476 by a compression spring 482. The driving pad 480 can be a generally disk shape or square plate shape with an upper surface 484 and a lower surface 486. The upper surface 484 can include a self-aligning feature, for example, a concave shape. The compression spring 482 can be configured as a misalignment device to compensate for an out of alignment condition of the portable container 410. For example, the compression spring 482 can bend the driving pad 480 out of the way when the portable container 410 is not aligned with the frame 116 as will be disclosed hereinafter. In some embodiments, a shaft 494 of the motion generator 476 can contact the lower surface 486 of the driving pad 480 when the compression spring is fully collapsed.

In some embodiments, the shaft 494 of the motion generator 476 can produce a periodic or cyclical motion. The motion generator 476 can produce a back and forth motion with a defined amplitude during a time period, e.g., a cycle. The oscillatory device 310 can produce a repeating motion or reciprocating motion with the defined amplitude during a defined cycle and can be referred to as a reciprocating device. In some embodiments, the motion generator 476 can produce a variable amplitude, for example, the motion generator 476 can change the start point and end point of motion of the shaft 494. In one scenario, the motion generator 476 can produce a large amplitude, e.g., 4 inches, from the start point to the end point of the motion of the shaft 494. In another scenario, the motion generator 476 can produce a periodic motion with a small amplitude, e.g., less than 1 inch, from the start point to the end point of the motion of the shaft 494. In some embodiments, the motion generator 476 can produce a periodic motion with a long cycle of motion with the shaft 494, for example, a cycle of 1 second. In a scenario, the motion generator 476 can produce a periodic motion, e.g., a wave motion, similar to the portable container (or a portion of the portable container) floating on a body of water. In some embodiments, the motion generator 476 can produce a periodic motion with a short cycle of motion, e.g., a cycle of a fraction of a second. In a scenario, the motion generator 476 can produce a shaking motion, for example, a motion with a long amplitude and a short cycle. In some embodiments, the motion generator 476 can produce a vibratory motion, for example, a periodic motion with a short amplitude during a short period. In some embodiments, the motion generator 476 can produce a variable periodic motion that transitions from a first type of motion to a second type of motion. For example, the motion generator 476 can transition from a wave motion, e.g., a first type of motion, to a shaking motion, e.g., a second type of motion.

In some embodiments, the motion generator 476 of the oscillatory device 310 can produce a periodic motion to a specific location on the portable container 410, a portion of the portable container 410, or the entire portable container 410. In some scenarios, the number of active motion generators 476 coupled to the portable container 410 can determine the portion of the portable container 410 receiving the periodic motion. For example, a single active oscillatory device 310 can impart a periodic motion to a single specific location, e.g., a side wall of the hopper 416. In a second scenario, an active oscillatory device 310 located on each side of the hopper 416, e.g., four active oscillatory devices 310, can produce a periodic motion to a portion of the portable container 410, e.g., the hopper 416. In a third scenario, a plurality of active oscillatory devices 310 coupled to the portable container, or supporting the portable container, can produce a periodic motion to the entire portable container 410, e.g., shake the portable container 410 like an earthquake.

The portable container 410 can be in contact with the oscillatory device 310 while the portable container 410 is installed or sitting within the receiving bay 132 of the portable support structure 314. In some embodiments, the oscillatory device 310 can be coupled to the portable container 410, for example, installed onto a specific location of the portable container 410. For example, an oscillatory device 310 can be mechanically coupled, e.g., welded, to the transfer member 460 or the sidewall of the hopper 416. In some embodiments, the portable container 410 can be partially or completely sitting on the oscillatory device 310. For example, an oscillatory device 310 can experience a compression loading from the portable container 410 being placed onto the receiving bay 132 of the portable support structure 314 as will be further described herein. The portable container 410 can be in contact with the oscillatory device 310 during the operation of the oscillatory device 310.

Although the self-aligning feature of the driven pad 466 and driving pad 480 is described as located a convex cone shape within a concave cone shape, it is understood that the self-aligning feature can be any two mating shapes. For example, the self-aligning feature can be i) a cone shape inside a concave conical shape, ii) a ball shape inside a concave spherical shape, iii) a pyramid shape inside a pyramidal concave shape, or any similar geometric shape.

Continuing with FIG. 4C, a method of aligning a portable container onto a portable support structure with oscillatory devices 310 is described. A portable container 410 can include one or more transfer member 460 coupled to the angled hopper 146. The driven pad 466 can be recessed a distance "D" from the bottom surface 488 of the bottom support 454. As previously described, the driving pad 480 of the oscillatory device 310 can be a distance A above the top surface 134 of the frame 166. The locator device 152 can be a distance B above the top surface 134 of the frame 166. In some embodiments, the distance B of the locator device 152 can be greater than or equal to the distance A of the driving pad 480 and the engagement feature 440 of the portable container 410 can be aligned with locator device 152 before the driving pad 480 contacts the driven pad 466. The alignment of the engagement feature 440 with the locator device 152 can align or configure the driving pad 480 into alignment with the driven pad 466. As the portable container 410 is lowered onto the portable support structure 314, e.g., the bottom surface 488 of the bottom support 454 is lowered into contact with the top surface 134 of the frame 116, the driving pad 480 of the oscillatory device 310 enters into the driven pad 466 of the transfer member 460. The direct connection of the bottom surface 488 of the bottom support 454 can place the driving pad 480 in direct contact with the driven pad 466 and collapse the compression spring 482 into a compressive state. The placement of the portable container 411 onto the portable support structure 314 can configure the transfer member 460 and oscillatory device 310 into a motion configuration wherein the oscillation motion, e.g., amplitude and period, is transferred from the motion generator 476 to the angled hopper 416 via the transfer member 460.

In some embodiments, the distance B of the alignment device can be less than the distance A of the driving pad 480. The engagement feature 440 of the portable container 410 can be aligned with locator device 152, however the driving pad 480 can contact the driven pad 466 first before the locator device 152 is placed within the engagement feature 440 of the portable container 410. The driving pad 480 can align with the driven pad 466 in response to the self-aligning feature centralizing the driving pad 480 within the driven pad 466. In another scenario, the compression spring 482 can deflect to move the driving pad 480 away from the driven pad 466 in response to the driving pad 480 being out of alignment with the driven pad 466 before the engagement feature 440 aligns with the locator device 152. The alignment of the driving pad 480 within the driven pad 466 can allow the engagement feature 440 to align with the locator device 152. As the portable container 410 is lowered onto the portable support structure 314, e.g., the bottom surface 488 of the bottom support 454 is lowered into contact with the top surface 134 of the frame 116, the compression spring 482 coupled to the driving pad 480 can compress. The direct connection of the bottom surface 488 of the bottom support 454 can place the driving pad 480 in direct contact with the driven pad 466 and collapse the compression spring 482 into a compressive state. The placement of the portable container 411 onto the portable support structure 314 can configure the transfer member 460 and oscillatory device 310 into a motion configuration wherein the oscillation motion, e.g., amplitude and period, is transferred from the motion generator 476 to the angled hopper 416 via the transfer member 460.

The portable frame can utilize impact devices to hit or strike the portable container. Turning now to FIGS. 5A and 5B, a material handling system 500 comprises an impact device 510 coupled to the portable support structure 314. The material handling system 500 can be an embodiment of the material handling system 400 with the impact device 510 replacing the oscillatory device 310. As previously described, the portable support structure 314 is configured to receive one or more portable containers 410.

In some embodiments, the impact device 510 comprises a housing 512 coupled to the support frame 312, a hammer element 514, and a strike bar 516. A force generator 520 can accelerate the hammer element 514 upwards by various means including a pneumatic mechanism, a hydraulic mechanism, an electric actuator, or combinations thereof. For example, an electric actuator can move the hammer element 514 to a cocked position as the pneumatic mechanism pumps air into a piston chamber. The electric actuator can release the hammer element 514 in response to the air pressure within the piston chamber reaching a threshold value. In another scenario, the hydraulic mechanism can transfer fluid into a first chamber to compress a spring couple to or biasing the hammer element 514. An electric actuator can release the hammer element 514 in response to the spring force reaching or exceeding a threshold value. In still another scenario, an electric actuator can accelerate the hammer element 514 upwards with electro-magnets within the housing 512 interacting with permanent magnets or similar material on the hammer element 514.

The strike bar 516 can be a generally round rod shaped with an upper face 522, a lower face 524, and a support ring 526. The strike bar 516 can be referred to as an impact mass. A compression spring 530 can be located between the support ring 526 on the strike bar 516 and the top surface 134 of the frame 116 and can bias the strike bar 516 upwards to abut or contact a strike plate 532 coupled to the hopper 416 of the portable container 410. In some embodiments, the strike bar 516 includes a top cap 528. The top cap 528 can be made of a softer material, e.g., a hard plastic or hard rubber, to dampen the impact. In some embodiments, the strike plate 532 on the hopper 416 can be omitted such that the strike bar 516 contacts or impacts the outer surface of the hopper 416. Although the strike bar 516 is described with a round cross-section, it is understood that the cross-section can be any geometrical shape including triangular, square, rectangular, hexagonal, octagonal, cylinder, tubular, or any combination thereof.

Turning now to FIG. 5B, during operation of the one or more impact devices 510, the unit controller communicatively coupled to the support structure 314 can activate the force generator 520 on the impact device 510 to accelerate the hammer element 514 upwards to strike or impact the strike bar 516. An upper face 534 of the hammer element 514 can strike or impact the lower face 524 of the strike bar 516. The impact of the hammer element 514 can be transferred through the strike bar 516 via the upper face 522 of the strike bar 516 to the lower face 536 of the strike plate 532. The force generator 520 may reset to generate a plurality of impacts or strikes with the hammer element 514. In some embodiments, the strike plate 532 is omitted and the upper face 522 of the strike bar 516 impacts the outer surface of the hopper 416. In some embodiments, the strike plate 532 is replaced by the transfer member 460 comprising the column 464 and driven pad 466. In this embodiment, the hammer element 514 of the impact device 510 can strike the driven pad 466 and the impact energy can be transferred from the driven pad 466 to the hopper 416 via the transfer member 460.

In an embodiment, the force generator of the impact devices 510 can produce a reciprocating strike or impact with the strike bar 516 within a defined time period. The force generator can accelerate the hammer element 514 to produce a strike, retract the hammer element 514, and reset to accelerate the hammer element 514 for a subsequent strike during the designated time period. The impact devices 510 can repeatedly strike or deliver impact energy within a defined time period, e.g., frequency, and can be referred to as a reciprocating device.

In an aspect, the impact device 510 and the oscillatory device 310 can both be reciprocating devices that impart a different type of energy to the portable container 410. The force generator 520 of the impact device 510 can accelerate the hammer element 514 to contact a surface (e.g., hopper 416, strike plate 532, or transfer member 460) with a high force or shock repeating over a short period of time, e.g., like a drummer. The motion generator 476 of the oscillatory device 310 can produce a repeating motion with a short time period to the driving pad 480 that is in contact with a surface (e.g., hopper 416, strike plate 532, or driven pad 466). The motion generator 476 can produce a wave motion, a shaking motion, or a vibratory motion to a specific location, a portion of the portable container 410, the entire portable container 410, or combinations thereof. In contrast, the force generator 520 can accelerate a mass to contact or impact a surface with impact energy to a specific location on the portable container 410. The impact device 510 and the oscillatory device 310 can be a reciprocating device that produces i) an oscillating motion or ii) a percussive energy respectively.

In an aspect, the impact force or impact energy received from the impact device 510 can produce a shock to the receiving surface (e.g., hopper 416, strike plate 532, or transfer member 460). A shock can be defined as a sudden acceleration of a body by impact of another body with a high rate of force with respect to time. In an aspect, the shock received by the sidewall of the hopper 416 can be a percussive force, e.g., vibration of a surface. For example, a drum stick impacting a drum head can produce a percussive force. In another example, a mallet striking a gong (also called a tam-tam) can produce a percussive force. The impact device 510 can produce a percussive force on the sidewall of the hopper 416 via direct contact with the outer surface of the hopper 416, a strike plate 532, a transfer member 460, or combinations thereof. In an aspect, the impact device 510 striking the outer surface of the hopper produces a percussive force, for example periodic striking of the impact device 510 and the outer surface of the hopper, oscillatory striking via contact/non-contact oscillations of the impact device 510 and the outer surface of the hopper, and/or reciprocating striking via contact/non-contact reciprocation of the impact device 510 and the outer surface of the hopper.

In an aspect, a method comprises applying a percussive force to the hopper 416 (e.g., a percussive force resulting from (i) percussion between a receiving contact surface of the hopper and the hammer element 514 periodically oscillated by the oscillatory device 310 and/or (ii) percussion between the hammer element 514 and the outer surface of the hopper 416), wherein the percussive force is effective to promote downward movement of sand (e.g., wet sand) within the hopper 416 (e.g., the percussive force is effective to fluidize or place into motion wet sand stuck or immobilized within the hopper 416 such that the wet sand moves downward in the hopper and exits via the gravity feed outlet).

Figure 6:
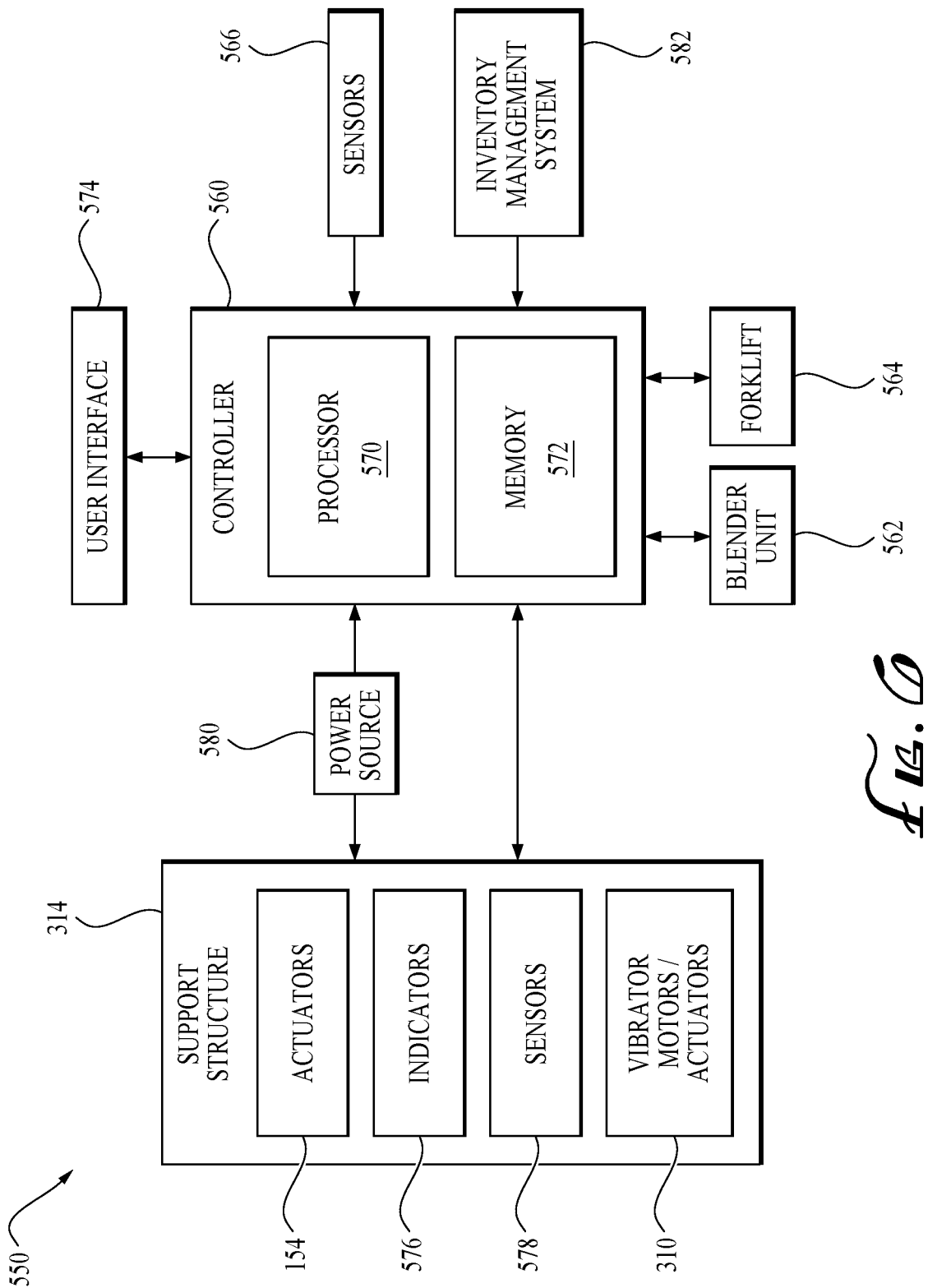
FIG. 6 is a block diagram of a computer system suitable for implementing one or more embodiments of the disclosure.

Turning now to FIG. 6, a block diagram of a computer system 550 suitable for implementing one or more embodiments of the disclosure is described. In some embodiments, the portable support structure 314 can comprise a unit controller 560 to direct the dispensing of bulk materials and to measure periodic datasets indicative of the wellbore servicing operation. The unit controller 560 may be communicatively coupled to one or more other unit controllers and in some embodiments a system controller at the remote wellsite. The support structure 314 may include a number of electronic components, and these components may be communicatively coupled (e.g., via a wired connection or wirelessly) to one or more unit controllers 560 (e.g., automated control system) at the well site. The unit controller 560 may be communicatively coupled to several other well site components including, but not limited to, the blender unit 562, a hoisting mechanism (e.g., forklift) 564, and various sensors 566.

The unit controller 560 can include at least one processor component 570 and a non-transitory memory component 572 to monitor and/or control various operations and inventory at the well site. For example, one or more processor components 570 may be designed to execute instructions encoded into the one or more non-transitory memory components 572. Upon executing these instructions, the processors 570 may provide passive logging of the operational states of one or more components at the well site, as well as the amount, type, and location of bulk material/dry additive at the well site. In some embodiments, the one or more processors 570 may execute instructions for controlling operations of certain well site components (e.g., support structure electronics). This may help to control sequencing of discharge gates on the bulk material containers, metering of dry additive into the blender, and other operations related to material transfer at the well site.

In some embodiments, the unit controller 560 may be coupled to a user interface 574, which enables an operator to input instructions for execution by the unit controller 560. The user interface 574 may also output data relating to the operational state of the bulk material/dry additive handling system. In some embodiments, the user interface 574 can display an indicia in response to the periodic datasets indicating a wet bulk material is not dispensing from a portable container. In some embodiment, the portable support structure 114 can include a visual cue, e.g., a light, as an indicia of the portable container dispensing or not dispensing wet bulk material into a material routing path.

In some embodiments, the unit controller 560 may be communicatively coupled to a number of sensors 566, e.g., the locator device 152, disposed on the support structure 314 and/or about the well site. Based on feedback from these sensors 566, the unit controller 560 may determine when to actuate discharge gates, e.g., discharge gate 422, to switch between different portable material containers, e.g., portable container 410, and dry additive containers that are positioned on the support structure 314. The unit controller 560 may also be communicatively coupled to a number of controllable components disposed on the support structure 314, the blender unit 562, and/or the forklift 564. The unit controller 560 may actuate certain of these controllable components based on sensor feedback.

The support structure 314 may include a number of electronic components such as, for example, the automated actuators 154 described above with reference to FIG. 2. These actuators 154 may be controlled to open and/or close a discharge gate, e.g., discharge gate 422, of one or more portable containers, e.g., portable container 410, elevated on the support structure 314. The support structure 314 may also include one or more indicators 576 (e.g., indicator lights) disposed on the support structure for providing various information about the operating state of the support structure 314.

In some embodiments, the support structure 314 may include various sensors 578 (e.g., fill level sensors, cameras, load cells, etc.) designed to take measurements and provide sensor feedback to the unit controller 560. The sensors 578 may be used to detect levels of bulk material and dry additive present in the hopper and/or output chutes, information regarding the number of containers disposed on the support structure 314, as well as the fill level of bulk material or dry additive within the individual containers on the support structure 314. The unit controller 560 may actuate the discharge gates, e.g., discharge gate 422, on different containers, e.g., portable container 411, with precisely controlled timing based on the received sensor feedback, e.g., locator device 152.

In some embodiments, the oscillatory devices 310 of the portable support structure 314 can be communicatively coupled to the unit controller 560. The unit controller 560 can actuate one or more oscillatory devices 310 by actuating the motion generator 476. In some embodiments, the unit controller 560 can actuate the oscillatory devices 310 based on a predetermined sequence for each portable container 411. In some embodiments, the unit controller 560 can actuate the vibration devices based on periodic datasets from various sensors 578, e.g., locator device 152.

The unit controller 560, the support structure electronics, or both, may utilize power from an external power source 580, as shown. In other embodiments, the support structure 314 may include its own power source 580 for operating the onboard electronics and sensors.

In some embodiments, the unit controller 560 may be communicatively coupled to an inventory management system 582 that monitors the inventory of bulk material and dry additive on location. The inventory management system 582 may include a separate control/monitoring system or may be incorporated into the unit controller 560. The inventory management system 582 may track bulk material inventory and dry additive inventory on location through the use of RFID technology or other identification tracking techniques. Each portable container may feature an identification component (e.g., RFID tag) used to provide an indication of the particle size, bulk volume, weight, type, material, and/or supplier of the bulk material or dry additive present in the container. In some embodiments, the identification components may be rewritable such that the bulk material or dry additive inventory of individual containers can be updated after discharging a portion of its contents at the support structure 314. The inventory management system 582 may be communicatively coupled to an RFID reader disposed in proximity to the containers being moved about the well site.

In some embodiments, the unit controller 560 may provide control signals to the oscillatory devices 310 and actuators 154 used to open and/or close the container discharge gates with appropriate timing for maintaining a steady supply of bulk material and dry additive to the blender unit 562. In some embodiments, an operator may use the user interface 574 to manually sequence the oscillatory devices 310 and initiate gate actuations of any desirable bulk material or dry additive containers on the support structure 314. Additional manual override techniques may also be available using, for example, manual hydraulic, pneumatic, or mechanical controls.

Additional Disclosure

The following are non-limiting, specific embodiments in accordance with the present disclosure:

A first embodiment, which is a bulk material handling system for dispensing wet materials at a wellsite, comprising at least one portable container comprising at least one engagement feature, at least one energy transfer member, and a gate, wherein the at least one energy transfer member is coupled to a bottom surface of an angled hopper, and wherein each of the at least one portable containers is configured to store a volume of wet bulk material; a portable support stand comprising a support frame with at least one receiving bay configured to receive the at least one portable container, wherein the at least one receiving bay comprises at least one locator device and a gate actuator, wherein the support frame comprises at least one reciprocating device and a material routing path, and wherein the material routing path is configured to route the wet material from an outlet of the portable container to a blender hopper; wherein mounting the at least one portable container onto the at least one receiving bay of the portable support stand couples the at least one energy transfer member to the at least one reciprocating device; and a unit controller comprising a processor and non-transitory memory configured to: deliver an oscillation or an impact with the at least one reciprocating device to a location on the angled hopper of the portable container on the support frame in response to the gate actuator being configured in an i) open or ii) meter position, wherein the oscillation is an oscillatory motion with a defined amplitude and period delivered from the at least one reciprocating device coupled to the support frame, and wherein the impact is a percussive force delivered from the at least one reciprocating device coupled to the support frame.

A second embodiment, which is the bulk material handling system of the first embodiment, wherein the unit controller is further configured to: receive periodic datasets indicative of dispensing bulk material from the portable container; and display an indicia in response to the periodic datasets indicating a wet bulk material is not dispensing from the at least one portable container.

A third embodiment, which is the bulk material handling system of the first or second embodiment, wherein the angled hopper is an upside-down pyramidal shape or cone shape; and wherein an outlet is located at a bottom of the angled hopper.

A fourth embodiment, which is the bulk material handling system of any of the first through the third embodiments, wherein the gate is configured to seal the outlet of the angled hopper in a closed position.

A fifth embodiment, which is the bulk material handling system of any of the first through the fourth embodiments, wherein the at least one locator device comprises a sensor and a locator feature; and wherein the locator feature is configured to receive the at least one engagement feature of the portable container.

A sixth embodiment, which is the bulk material handling system of any of the first through the fifth embodiments, wherein the at least one reciprocating device is an oscillatory device; wherein a driving pad of the oscillatory device couples with a driven pad of the at least one energy transfer member; and wherein the energy transfer member is configured to transfer oscillatory motion from the oscillatory device to the angled hopper in response to coupling the driving pad to the driven pad.

A seventh embodiment, which is the bulk material handling system of any of the first through the sixth embodiments, wherein the at least one reciprocating device is an impact device; wherein a strike bar of the impact device is configured to impact a specific location on the portable container; and wherein the specific location comprises i) an outer surface of the angled hopper, ii) an energy transfer member, or iii) combinations thereof.

An eighth embodiment, which is the bulk material handling system of any of the first through the seventh embodiments, wherein an actuator is configured to couple with the gate of the portable container.

A ninth embodiment, which is the bulk material handling system of any of the first through the eighth embodiments, wherein the material routing path comprises a feed hopper and a gravity feed outlet.

A tenth embodiment, which is the bulk material handling system of any of the first through the ninth embodiments, wherein the gravity feed outlet routes the wet material directly into a blender hopper without use of additional pneumatic or mechanical conveyance equipment.

An eleventh embodiment, which is the bulk material handling system of any of the first through the tenth embodiments, wherein the unit controller is further configured to: actuate the gate actuator on the support frame to i) open, ii) meter, or iii) close the gate on the at least one portable container.

An twelfth embodiment, which is the bulk material handling system of any of the first through the eleventh embodiments, wherein the wet bulk material is a dry bulk material with a moisture content exceeding 1 percent by weight.

A thirteenth embodiment, which is a method of dispensing wet material from a bulk material handling system at a remote wellsite, comprising receiving and holding at least one portable container of wet bulk material on a receiving bay of a portable support structure, wherein the at least one portable container comprises at least one transfer member coupled to a portion of an angled hopper; oscillating the angled hopper of the at least one portable container via the at least one transfer member by an oscillation device located on the portable support structure; and routing the wet bulk material from the at least one portable container to a blender hopper via a material routing path.

A fourteenth embodiment, which is the method of the thirteenth embodiment, further comprises aligning a locator feature of a locator device on the receiving bay of the portable support structure with an engagement feature of the at least one portable container, wherein the engagement feature of the at least one portable container is located on a bottom surface; and aligning a transfer member on the at least one portable container with a oscillation device on a support frame of the portable support structure in response to aligning the locator feature with the engagement feature, wherein a driven pad of the transfer member is aligned with a driving pad of the oscillation device, and wherein a self-alignment feature of the driven pad and driving pad is configured to align a bottom surface of the driven pad with a top surface of the driving pad.

A fifteenth embodiment, which is the method of any of the thirteenth through the fourteenth embodiments, further comprises contacting a driven pad of the transfer member to a driving pad of the oscillation device in response to a bottom surface of the at least one portable container contacting a top surface of the receiving bay; and configuring the transfer member to transfer motion from the oscillator device to the portion of the angled hopper in response to receiving the at least one portable container on the receiving bay of the portable support structure.

A sixteenth embodiment, which is the method of any of the thirteenth through the fifteenth embodiments, further comprising actuating a gate of the portable container with a gate actuator on the receiving bay of the portable support structure, and wherein the gate actuator configures the gate of the portable container in a i) open position, ii) meter position, or iii) a closed position.

A seventeenth embodiment, which is the method of any of the thirteenth through the sixteenth embodiments, further comprising transporting the at least one portable container of wet bulk material to the remote wellsite; transporting the portable support structure separate from the at least one portable container to the remote wellsite; and loading the at least one portable container onto the receiving bay.

A eighteenth embodiment, which is a bulk material handling system for dispensing wet materials at a wellsite, comprising at least one portable container comprising: an angled hopper with an outlet; at least one transfer member coupled to a portion of the angled hopper; and wherein the at least one portable container is configured to hold a volume of wet bulk materials; a portable support structure comprising: at least one receiving bay with at least one locator device and a gate actuator, wherein the at least one receiving bay is configured to receive a portable container, and wherein the at least one locator device is configured to be received within an engagement feature of the at least one portable container; a material routing path comprising a feed hopper and a gravity feed outlet; a support frame with at least one oscillatory device, at least one impact device, or combinations thereof, and a unit controller comprising a processor and non-transient memory communicatively coupled to the support frame, configured to: activate the at least one impact device or at least one oscillatory device on the support frame of the portable support structure, wherein i) impact energy of the at least one impact device is transferred via the at least one transfer member, ii) oscillatory motion of the at least one oscillatory device is transferred via the at least one transfer member, or ii) both; and wherein the portable support structure is configured to route the wet bulk material from the at least one portable container to a blender hopper via a material routing path in response to activating the at least one impact device or at least one oscillatory device.

A nineteenth embodiment, which is the system of the eighteenth embodiment, wherein the portable container further comprises: a frame with engagement features located in each corner; and a gate configured to selectively open or close the outlet.

A twentieth embodiment, which is the system of any of the eighteenth through the nineteenth embodiments, wherein the gate actuator couples to the gate of the portable container.

A twenty-first embodiment, which is the system of any of the eighteenth through the nineteenth embodiments, wherein the unit controller is further configured to actuate the gate of the portable container to an open position with the gate actuator.

A twenty-second embodiment, which is the system of any of the eighteenth through the twenty-first embodiments, wherein the unit controller is further configured to receive periodic datasets indicative of dispensing bulk material from the portable container from a sensor of the locator device.

A twenty-third embodiment, which is the system of any of the eighteenth through the twenty-second embodiments, wherein the angled hopper has a frustoconical shape or at least three sides.

A twenty-fourth embodiment, which is the system of any of the eighteenth through the twenty-third embodiments, wherein the angled hopper comprises i) two angled sides, ii) three angled sides, iii) four angled sides, iv) five angled sides, v) six angled sides, vi) seven angled sides, vii) eight angled sides, viii) two curved sides, ix) three curved sides, x) four curved sides, or xi) combinations thereof.

A twenty-fifth embodiment, which is a method for removing wet sand from a portable modular container, comprising applying impact energy to one or more corresponding specific locations on the portable modular container; wherein the impact energy is provided by contact of an impact face with the one or more specific locations on the portable modular container; and wherein the impact face contacts the portable modular container during an impact stroke and the impact face does not contact the portable modular container during a retraction stroke.

A twenty-sixth embodiment, which is the method of the twenty-fifth embodiments, wherein the impact energy is provided by an force generator or an oscillatory motion generator; wherein the impact face is located on an impact mass; wherein the impact mass is accelerated by the force generator or the oscillatory motion generator during the impact stroke; wherein the impact mass is retracted by the force generator or the oscillatory motion generator during the retraction stroke; and wherein the force generator or oscillatory motion generator provides a periodic reciprocating motion of the impact mass.

A twenty-seventh embodiment, which is the method of the twenty-fifth embodiment and the twenty-sixth embodiment, wherein the portable container comprises an interior, at least one inlet, and a lower portion with at least one outlet; wherein the lower portion is fluidically coupled with the interior; wherein the one or more specific locations on the container are located on an outer surface of the lower portion; wherein the lower portion of the container comprises at least one angled side; wherein the outlet of the container is selectively occluded by a discharge gate; and wherein the discharge gate comprises a ladder gate, a clamshell gate, an iris gate, or a slide gate.

A twenty-eighth embodiment which is a method and system for removing wet sand from a portable modular container comprising applying impact energy to one or more corresponding specific locations on the container (e.g., angled sidewalls on a lower portion of the container adjacent a slide-gate exit thereof), wherein the impact energy is provided by reciprocating contact of an impact face (e.g., an impact head of a reciprocating arm driven by a reciprocating motor/driver) with the specific locations on the container and wherein the impact face contacts the container during an impact stroke of the reciprocating arm driven by the motor and the impact face does not contact the container during a retraction stroke of the reciprocating arm retracted by the motor.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: $R=R1+k*(Ru-R1)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A bulk material handling system for dispensing wet materials at a wellsite, comprising:
at least one portable container comprising at least one engagement feature, at least one energy transfer member, and a gate, wherein the at least one energy transfer member is coupled to a bottom surface of an angled hopper, and wherein each of the at least one portable containers is configured to store a volume of wet bulk material;
a portable support stand comprising a support frame with at least one receiving bay configured to receive the at least one portable container, wherein the at least one receiving bay comprises at least one locator device and a gate actuator, wherein the support frame comprises at least one reciprocating device and a material routing path, and wherein the material routing path is configured to route the wet material from an outlet of the portable container to a blender hopper, wherein the locator device is configured to receive the at least one engagement feature of the portable container;
wherein mounting the at least one portable container onto the at least one receiving bay of the portable support stand couples the at least one energy transfer member to the at least one reciprocating device; and a unit controller comprising a processor and non-transitory memory configured to:
  deliver an oscillation or an impact with the at least one reciprocating device to a location on the angled hopper of the portable container on the support frame in response to the gate actuator being configured in an i) open or ii) meter position, wherein the oscillation is an oscillatory motion with a defined amplitude and period delivered from the at least one reciprocating device coupled to the support frame, and wherein the impact is a percussive force delivered from the at least one reciprocating device coupled to the support frame.

2. The bulk material handling system of claim 1, wherein the unit controller is further configured to:
  receive periodic datasets indicative of dispensing bulk material from the portable container; and
  display an indicia in response to the periodic datasets indicating a wet bulk material is not dispensing from the at least one portable container.

3. The bulk material handling system of claim 1, wherein:
  the angled hopper is an upside-down pyramidal shape or cone shape; and
  wherein an outlet is located at a bottom of the angled hopper.

4. The bulk material handling system of claim 1, wherein:
  the gate is configured to seal the outlet of the angled hopper in a closed position.

5. The bulk material handling system of claim 4, wherein:
  the at least one locator device comprises a sensor.

6. The bulk material handling system of claim 1, wherein:
  the at least one reciprocating device is an oscillatory device;
  wherein a driving pad of the oscillatory device couples with a driven pad of the at least one energy transfer member; and
  wherein the energy transfer member is configured to transfer oscillatory motion from the oscillatory device to the angled hopper in response to coupling the driving pad to the driven pad.

7. The bulk material handling system of claim 1, wherein:
  the at least one reciprocating device is an impact device;
  wherein a strike bar of the impact device is configured to impact a specific location on the portable container; and
  wherein the specific location comprises i) an outer surface of the angled hopper, ii) an energy transfer member, or iii) combinations thereof.

8. The bulk material handling system of claim 1, wherein an actuator is configured to couple with the gate of the portable container.

9. The bulk material handling system of claim 1, wherein the material routing path comprises a feed hopper and a gravity feed outlet.

10. The bulk material handling system of claim 9, wherein the gravity feed outlet routes the wet materials directly into a blender hopper without use of additional pneumatic or mechanical conveyance equipment.

11. The bulk material handling system of claim 1, wherein the unit controller is further configured to:
  actuate the gate actuator on the support frame to i) open, ii) meter, or iii) close the gate on the at least one portable container.

12. The bulk material handling system of claim 1, wherein the wet material is a dry bulk material with a moisture content exceeding 1 percent by weight.

13. A method of dispensing wet material from a bulk material handling system at a remote wellsite, comprising:
  aligning a transfer member on at least one portable container with an oscillation device on a support frame of a portable support structure in response to aligning a locator feature with an engagement feature;
  receiving and holding the at least one portable container of wet bulk material on a receiving bay of the portable support structure, wherein the at least one portable container comprises at least one transfer member coupled to a portion of an angled hopper;
  oscillating the angled hopper of the at least one portable container via the at least one transfer member by an oscillation device located on the portable support structure; and
  routing the wet bulk material from the at least one portable container to a blender hopper via a material routing path.

14. The method of claim 13, further comprising:
  aligning the locator feature on the receiving bay of the portable support structure with the engagement feature of the at least one portable container, wherein the engagement feature of the at least one portable container is located on a bottom surface; and
  wherein a driven pad of the transfer member is aligned with a driving pad of the oscillation device, and wherein a self-alignment feature of the driven pad and driving pad is configured to align a bottom surface of the driven pad with a top surface of the driving pad.

15. The method of claim 13, further comprising:
  contacting a driven pad of the transfer member to a driving pad of the oscillation device in response to a bottom surface of the at least one portable container contacting a top surface of the receiving bay; and
  configuring the transfer member to transfer motion from the oscillator device to the portion of the angled hopper in response to receiving the at least one portable container on the receiving bay of the portable support structure.

16. The method of claim 13, further comprising:
  actuating a gate of the at least one portable container with a gate actuator on the receiving bay of the portable support structure, and wherein the gate actuator configures the gate of the portable container in a i) open position, ii) meter position, or iii) a closed position.

17. The method of claim 13, further comprising:
  transporting the at least one portable container of wet bulk material to the remote wellsite;
  transporting the portable support structure separate from the at least one portable container to the remote wellsite; and
  loading the at least one portable container onto the receiving bay.

18. A bulk material handling system for dispensing wet materials at a wellsite, comprising:
  at least one portable container comprising:
    an angled hopper with an outlet;
    at least one transfer member coupled to a portion of the angled hopper; and
    wherein the at least one portable container is configured to hold a volume of wet bulk materials;
  a portable support structure comprising:
    at least one receiving bay with at least one locator device and a gate actuator,
      wherein the at least one receiving bay is configured to receive a portable container, and wherein the at least one locator device is configured to be received within an engagement feature of the at least one portable container;
a material routing path comprising a feed hopper and a gravity feed outlet;
a support frame with at least one oscillatory device, at least one impact device, or combinations thereof; and
a unit controller comprising a processor and non-transient memory communicatively coupled to the support frame, configured to:
activate the at least one impact device or at least one oscillatory device on the support frame of the portable support structure, wherein i) impact energy of the at least one impact device is transferred via the at least one transfer member, ii) oscillatory motion of the at least one oscillatory device is transferred via the at least one transfer member, or ii) both; and
wherein the portable support structure is configured to route the wet bulk material from the at least one portable container to a blender hopper via a material routing path in response to activating the at least one impact device or at least one oscillatory device.

19. The system of claim 18, wherein the portable container further comprises:
a frame with engagement features located in each corner; and
a gate configured to selectively open or close the outlet.

20. The system of claim 19, wherein the gate actuator couples to the gate of the portable container.

21. The system of claim 20, wherein the unit controller is further configured to actuate the gate of the portable container to an open position with the gate actuator.

22. The system of claim 18, wherein the unit controller is further configured to receive periodic datasets indicative of dispensing bulk material from the portable container from a sensor of the locator device.

23. The system of claim 18, wherein the angled hopper has a frustoconical shape or at least three sides.

24. The system of claim 23, wherein the angled hopper comprises i) two angled sides, ii) three angled sides, iii) four angled sides, iv) five angled sides, v) six angled sides, vi) seven angled sides, vii) eight angled sides, viii) two curved sides, ix) three curved sides, x) four curved sides, or xi) combinations thereof.

* * * * *